United States Patent
Chang

(10) Patent No.: US 8,179,480 B2
(45) Date of Patent: May 15, 2012

(54) SYSTEMS AND METHODS FOR AUTOMATED CHANNEL UPDATING

(75) Inventor: Chih-Cheng Chang, Keelung (TW)

(73) Assignee: AU Optronics Corp., Hsinchu (TW)

( * ) Notice: Subject to any disclaimer, the term of this patent is extended or adjusted under 35 U.S.C. 154(b) by 1269 days.

(21) Appl. No.: 11/622,451

(22) Filed: Jan. 11, 2007

(65) Prior Publication Data

US 2008/0094521 A1    Apr. 24, 2008

(30) Foreign Application Priority Data

Oct. 20, 2006   (TW) ............................... 95138743 A

(51) Int. Cl.
| | |
|---|---|
| H04N 5/50 | (2006.01) |
| H04N 7/00 | (2006.01) |
| H04N 5/445 | (2006.01) |
| H04N 7/173 | (2006.01) |
| G06F 3/00 | (2006.01) |
| G06F 13/00 | (2006.01) |

(52) U.S. Cl. ............ 348/731; 348/473; 725/38; 725/54; 725/86; 725/115

(58) Field of Classification Search .................. None
See application file for complete search history.

(56) References Cited

U.S. PATENT DOCUMENTS

| | | | | |
|---|---|---|---|---|
| 6,483,547 | B1 * | 11/2002 | Eyer | 348/473 |
| 7,096,485 | B2 * | 8/2006 | Voyer et al. | 725/54 |
| 7,113,230 | B1 * | 9/2006 | Genovese et al. | 348/731 |
| 2001/0030713 | A1 * | 10/2001 | Meersseman | 348/731 |
| 2004/0158870 | A1 * | 8/2004 | Paxton et al. | 725/115 |
| 2005/0114889 | A1 | 5/2005 | Liu et al. | |
| 2006/0212913 | A1 * | 9/2006 | Hirose et al. | 725/86 |

FOREIGN PATENT DOCUMENTS

| | | |
|---|---|---|
| CN | 1783968 A | 6/2006 |
| EP | 0949811 A1 | 10/1999 |
| GB | 2393053 A | 3/2004 |
| KR | 20040079497 | 9/2004 |
| TW | 227638 | 2/2005 |

* cited by examiner

Primary Examiner — Jefferey Harold
Assistant Examiner — Sean Haiem

(57) ABSTRACT

A method for automated channel updating is provided. In step (a), a frequency carrying channel data is detected. In step (b), it is determined whether a channel list comprises the frequency by retrieving a frequency table, where the frequency table stores information indicating whether the frequency is comprised in the channel list, and the channel list records a mapping relationship between a channel number and the frequency. In step (c), an unused channel number in the channel list is assigned to the detected frequency not in the channel list, where the unused channel number does not map to the frequency.

16 Claims, 15 Drawing Sheets

| Channel Number | Primary Key | Reserved Flag |
|---|---|---|
| 1 | 1 | 1 |
| 2 | 0 | 0 |
| 3 | 2 | 1 |
| 4 | 3 | 0 |
| 5 | 4 | 0 |
| 6 | 5 | 0 |
| ... | ... | ... |
| 96 | 0 | 0 |
| 97 | 0 | 0 |
| 98 | 0 | 0 |
| 99 | 0 | 0 |

| Primary Key | Assigned Flag |
|---|---|
| 1 | 1 |
| 2 | 1 |
| 3 | 1 |
| 4 | 1 |
| 5 | 1 |
| 6 | 0 |
| ... | ... |
| 96 | 0 |
| 97 | 0 |
| 98 | 0 |
| 99 | 0 |

| Primary Key | Unassigned Flag |
|---|---|
| 1 | 0 |
| 2 | 0 |
| 3 | 0 |
| 4 | 0 |
| 5 | 0 |
| 6 | 0 |
| ... | ... |
| 96 | 0 |
| 97 | 0 |
| 98 | 0 |
| 99 | 0 |

| Primary Key | Frequency | Video Standard | Audio Standard | Channel Name |
|---|---|---|---|---|
| 1 | 176.00 | 1 | 1 | "CNN" |
| 2 | 495.25 | 1 | 1 | "HBO" |
| 3 | 575.25 | 1 | 1 | "Discovery" |
| 4 | 655.25 | 1 | 1 | "News2" |
| 5 | 870.00 | 1 | 1 | "XFile" |
| ...... | ...... | ...... | ...... | ...... |
| 96 | 0 | 0 | 0 | "\0\0\0\0\0" |
| 97 | 0 | 0 | 0 | "\0\0\0\0\0" |
| 98 | 0 | 0 | 0 | "\0\0\0\0\0" |
| 99 | 0 | 0 | 0 | "\0\0\0\0\0" |

FIG. 6d

| Primary Key | Valid Flag |
|---|---|
| 5 | 1 |

| Frequency | Recorded Flag |
|---|---|
| 176.00 | 1 |
| 200.00 | 0 |
| 471.25 | 0 |
| 495.50 | 1 |
| 527.25 | 0 |
| 575.00 | 1 |
| 599.25 | 0 |
| 655.00 | 1 |
| 711.00 | 0 |

| Primary Key | Assigned Flag |
|---|---|
| 1 | 1 |
| 2 | 1 |
| 3 | 1 |
| 4 | 1 |
| 5 | 1 |
| 6 | 1 |
| ... | ... |
| 96 | 0 |
| 97 | 0 |
| 98 | 0 |
| 99 | 0 |

FIG. 8a

| Primary Key | Unassigned Flag |
|---|---|
| 1 | 0 |
| 2 | 0 |
| 3 | 0 |
| 4 | 0 |
| 5 | 0 |
| 6 | 1 |
| ... | ... |
| 96 | 0 |
| 97 | 0 |
| 98 | 0 |
| 99 | 0 |

FIG. 8b

| Primary Key | Frequency | Video Standard | Audio Standard | Channel Name |
|---|---|---|---|---|
| 1 | 176.00 | 1 | 1 | "CNN" |
| 2 | 495.25 | 1 | 1 | "HBO" |
| 3 | 575.25 | 1 | 1 | "Discovery" |
| 4 | 655.25 | 1 | 1 | "News2" |
| 5 | 870.00 | 1 | 1 | "XFile" |
| 6 | 712.00 | 1 | 1 | "News1" |
| ... | ... | ... | ... | ... |
| 96 | 0 | 0 | 0 | "0\0\0\0\0" |
| 97 | 0 | 0 | 0 | "0\0\0\0\0" |
| 98 | 0 | 0 | 0 | "0\0\0\0\0" |
| 99 | 0 | 0 | 0 | "0\0\0\0\0" |

FIG. 8c

| Channel Number | Primary Key | Reserved Flag |
|---|---|---|
| 1 | 1 | 1 |
| 2 | 6 | 0 |
| 3 | 2 | 1 |
| 4 | 3 | 0 |
| 5 | 4 | 0 |
| 6 | 5 | 0 |
| .... | .... | .... |
| 96 | 0 | 0 |
| 97 | 0 | 0 |
| 98 | 0 | 0 |
| 99 | 0 | 0 |

| Frequency | Recorded Flag |
|---|---|
| 176.00 | 1 |
| 200.00 | 0 |
| 471.25 | 0 |
| 495.50 | 1 |
| 527.25 | 0 |
| 575.00 | 1 |
| 599.25 | 0 |
| 655.00 | 1 |
| 711.00 | 1 |

| Channel Number | Primary Key | Reserved Flag |
|---|---|---|
| 1 | 1 | 1 |
| 2 | 0 | 0 |
| 3 | 2 | 1 |
| 4 | 3 | 0 |
| 5 | 4 | 0 |
| 6 | 5 | 0 |
| 7 | 6 | 0 |
| ... | ... | ... |
| 96 | 0 | 0 |
| 97 | 0 | 0 |
| 98 | 0 | 0 |
| 99 | 0 | 0 |

FIG. 8f

SYSTEMS AND METHODS FOR AUTOMATED CHANNEL UPDATING

BACKGROUND

The invention relates to automated channel updating, and more particularly, to systems and methods for automated channel updating in display apparatuses.

Televisions (TVs) are typically equipped with an auto update system to automatically search for frequencies carrying signals and accordingly update a present channel list. A user may direct a TV tuner to lock on to a particular frequency by switching to a channel in the channel list. The auto update method however, may be time consuming, decreasing user convenience.

SUMMARY

Methods for automated channel updating are provided. An embodiment of a method for automated channel updating comprises the following steps (a) to (c). In step (a), a frequency carrying channel data is detected. In step (b), it is determined whether a channel list comprises the frequency by retrieving a frequency table. The frequency table stores information indicating whether a particular frequency is comprised in the channel list, and the channel list records a mapping relationship between a channel number and the frequency. In step (c), an unused channel number in the channel list is assigned to the detected frequency not in the channel list by executing a channel number assigning operation, where the unused channel number does not map to the frequency. Methods for automated channel updating may be performed in an electronic apparatus. The electronic apparatus may be a CRT display, a plasma display panel (PDP) display, a liquid crystal display (LCD), an organic light-emitting diode displays (OLED) or a TV box.

The channel number assigning operation of step (c) may further comprise steps (c-1) to (c-2). In step (c-1), a default frequency assigning operation is performed. In step (c-2), the unused channel number is assigned to the frequency in a cache table after completing the default frequency assigning operation. Step (c-1) may further comprise steps (c-1-1) to (c-1-3). In step (c-1-1), it is determined whether the frequency maps to a default channel number. In step (c-1-2), the default channel number is assigned to the frequency when the frequency maps to the default channel number. In step (c-1-3), the frequency is stored in the cache table when the frequency does not map to the default channel number. The order of steps (c-1-2) and (c-1-3) can be exchanged. In step (c-2), the unused channel number may be sequentially assigned to the frequency in the cache table from the least to the greatest, or the unused channel number larger than the maximum of used channel numbers may be sequentially assigned to the frequency in the cache table from the least to the greatest. Step (c-1-1) may further comprise steps (c-1-1-1) to (c-1-1-3). In step (c-1-1-1), a country and network (CNI) code corresponding to the frequency is acquired. In step (c-1-1-2), a channel name corresponding to the CNI code is acquired. In step (c-1-1-3), it is determined whether the channel name corresponding to the frequency maps to the default channel number. In step (c-1-1-1), the CNI code may be acquired by querying a teletext processor.

Step (b) may further comprise determining whether the detected frequency falls into a tolerance range of the frequency in the frequency table; and, if not, determining that the detected frequency is not in the channel list.

Systems for automated channel updating are provided. An embodiment of a system for automated channel updating comprises a storage device and a processing unit. The storage device stores a frequency table and a channel list, where the frequency table stores information indicating whether a particular frequency is comprised in the channel list, and the channel list records a mapping relationship between a channel number and the frequency. The processing unit, coupling to the storage device, detects a frequency carrying channel data, determines whether the channel list comprises the frequency by retrieving the frequency table, and assigns an unused channel number in the channel list to the detected frequency not in the channel list by executing a channel number assigning operation, where the unused channel number is not mapped to the frequency. The system for automated channel updating may be installed in a CRT display, a PDP display, a LCD, an OLED or a TV box.

The channel number assigning operation may further comprise performing a default frequency assigning operation, and assigning the unused channel number to the frequency in a cache table after completing the default frequency assigning operation. The default frequency assigning operation may further comprise determining whether the frequency maps to a default channel number, assigning the default channel number to the frequency when the frequency maps to the default channel number, and storing the frequency in the cache table when the frequency does not map to the default channel number. Subsequently, when assigning a unused channel number to the frequency in the cache table, the processing unit may sequentially assign the unused channel number to the frequency in the cache table from the least to the greatest, or, sequentially assign the unused channel number larger than the maximum of used channel numbers to the frequency in the cache table from the least to the greatest. The processing unit may acquire a country and network (CNI) code corresponding to the frequency, acquire a channel name corresponding to the CNI code, and determine whether the channel name corresponding to the frequency maps to the default channel number. The system for automated channel updating may further comprise a teletext processor coupling to the processing unit. The processing unit may acquire the CNI code by querying the teletext processor.

The processing unit may determine whether the detected frequency falls into a tolerance range of the frequency in the frequency table, and, if not, indicate that the detected frequency is not in the channel list.

The frequency table may be a common frequency table or a rare frequency table. The common frequency table stores multiple common frequencies and whether each common frequency has been recorded in the channel list. Data stored in the rare frequency table indicates that at least one rare frequency has been recorded in the channel list.

BRIEF DESCRIPTION OF DRAWINGS

The invention will become more fully understood by referring to the following detailed description with reference to the accompanying drawings, wherein:

FIG. 5b is a flowchart of an embodiment of a detailed determination process performed by step S521 of FIG. 5a;

FIGS. 6a to 6f are diagrams of exemplary primary key, channel profile, cache, channel configuration, common frequency and rare frequency tables;

FIGS. 8a to 8f are diagrams of exemplary modification results in various aspects.

DETAILED DESCRIPTION

Figure 1:
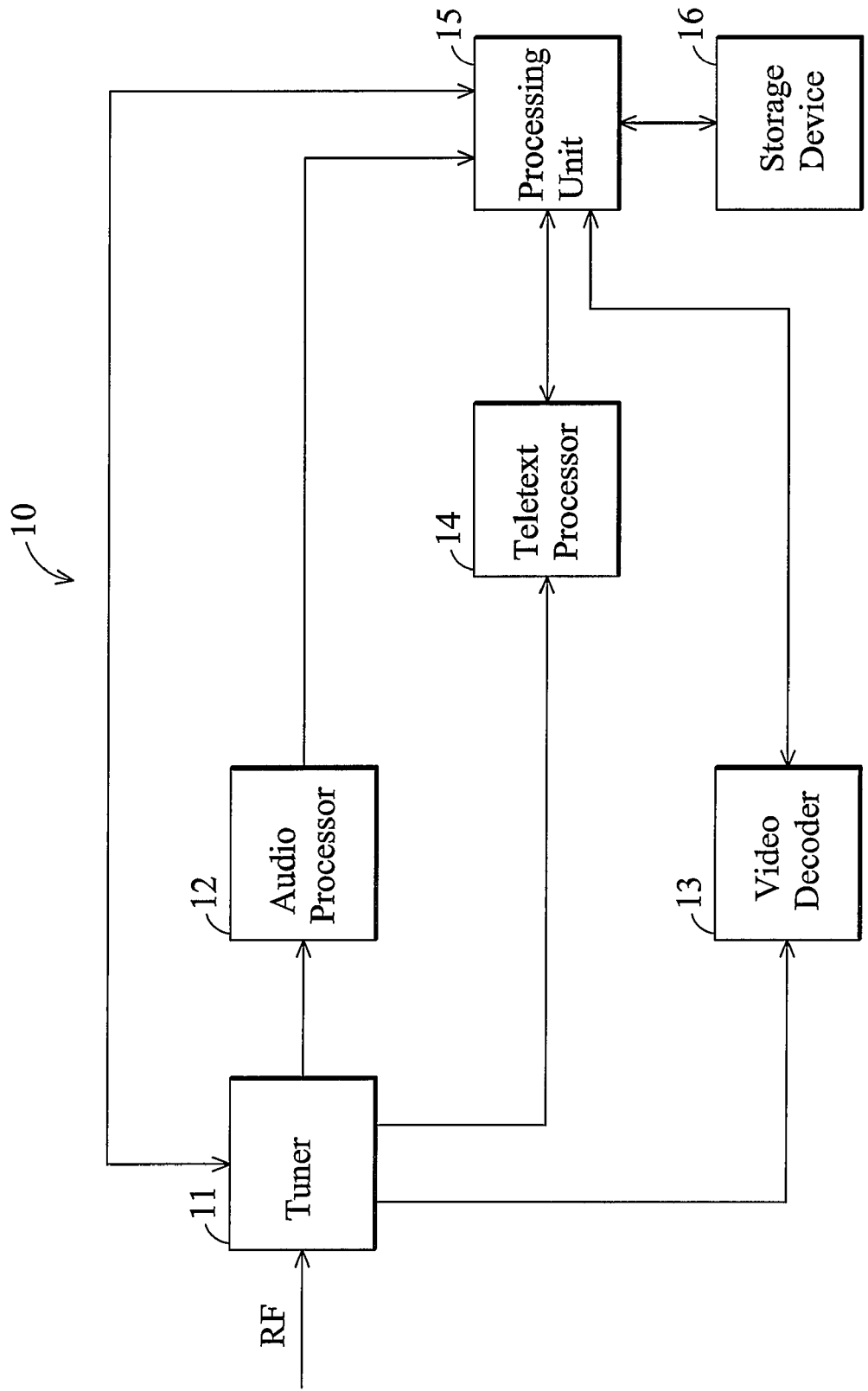
FIG. 1 is a diagram of the system architecture applicable to an embodiment of an automated channel updating system.

FIG. 1 is a diagram of the system architecture applicable to an embodiment of an automated channel updating system 10 comprising a tuner 11, an audio processor 12, a video decoder 13, a teletext processor 14, a processing unit 15 and a storage device 16. The automated channel updating system 10 may be installed in TV boxes, or in various display apparatuses such as CRT displays, plasma display panels (PDPs), liquid crystal displays (LCDs), organic light-emitting diode displays (OLEDs) and others. The storage device 16 may be read only memory (ROM), flash memory or random access memory (RAM) for storing program modules executed by the processing unit 15. The processing unit 15 loads and executes program modules, with the tuner 11, audio processor 12, video decoder 13 and teletext processor 14, to automatically update channels. The tuner 11 locks on to a particular frequency and acquires video and audio signals carried on the frequency. The teletext processor 14 acquires the teletext signals. The tuner 11 may first select a specific frequency such as 176.00 MHz, and the video decoder 13, the audio processor 12 and the teletext processor 14 detect whether the selected frequency carries video, audio or teletext signals capable of being displayed or played. If so, the tuner locks on to the selected frequency. The details for locking on to a particular frequency are well known in the art, and are only briefly described herein.

Figure 2:
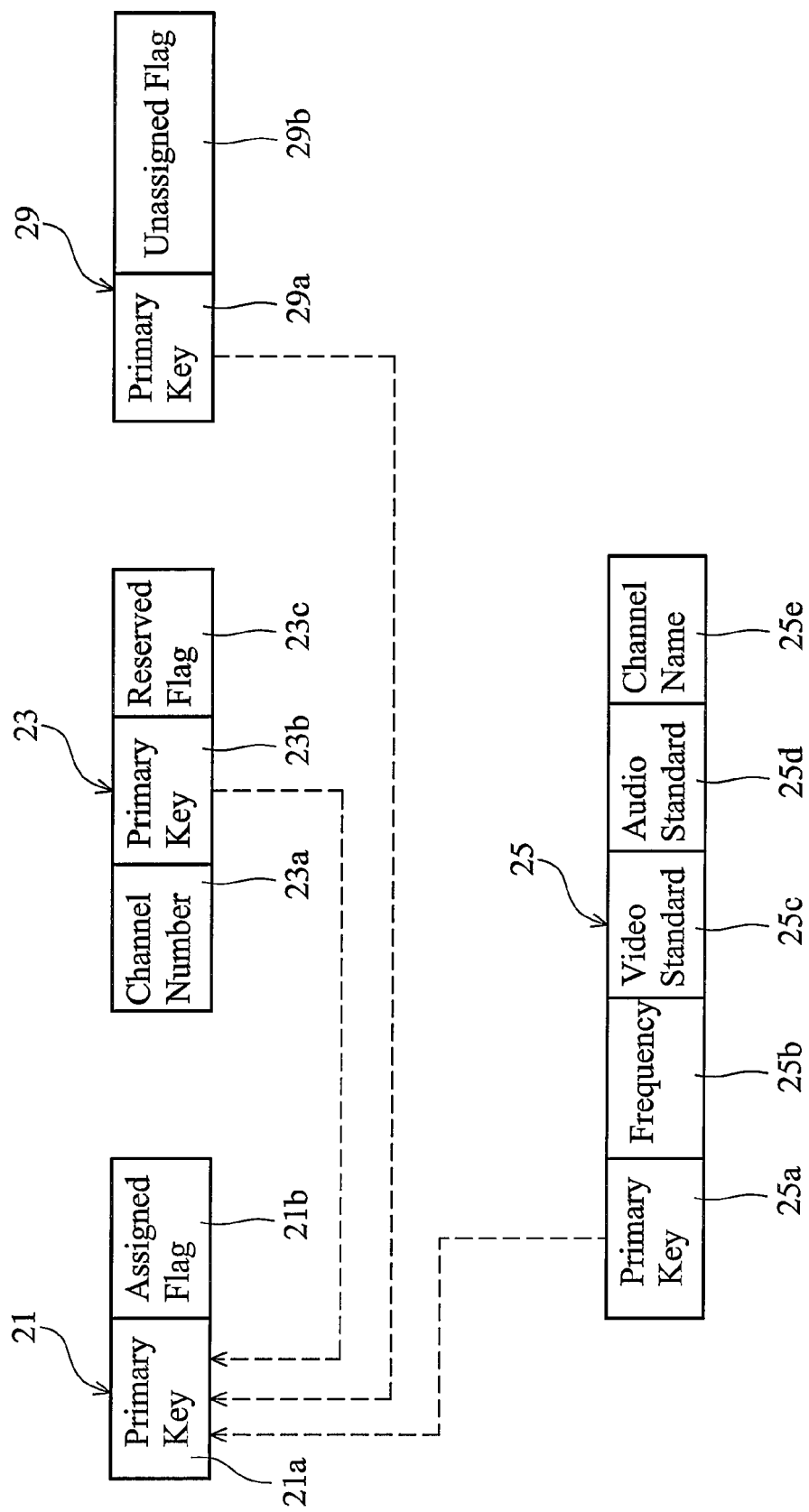
FIG. 2 is a diagram of an exemplary data structure.

FIG. 2 is a diagram of exemplary data structure. The storage device 16 stores a primary key table 21, a channel profile table 23, a channel configuration table 25 and a cache table 29.

The primary key table 21 contains two fields, primary key 21a and assigned flag 21b, storing information indicating whether a particular primary key is assigned. For example, a record of the primary key table 21 storing a primary key "1" and an assigned flag "true" or "1" indicates that the primary key "1" has been assigned. A record of the primary key table 21 storing a primary key "2" and an assigned flag "false" or "0" indicates that the primary key "2" has not been assigned. In order to improve access efficiency, the primary key table 21 is preferably initiated to store a predetermined number of records (e.g. 100 records) and each initial record contains a primary key with an identical serial number (e.g. one of 1 to 100), and an assigned flag with "false" or "0".

Referring to FIG. 2, the channel profile table 23 contains three fields, channel number 23a, primary key 23b and reserved flag 23c, storing information indicating that a primary key is associated with a channel number and whether a frequency corresponding to the channel number is a reserved channel. For example, a record of the channel profile table 23 storing a primary key "1", a channel number "1" and a reserved flag "true" or "1" indicates that the primary key "1" is associated with the channel number "1" and the frequency corresponding to the channel number "1" is a reserved channel. A record of the channel profile table 23 storing a primary key "2", a channel number "2" and a reserved flag "false" or "0" indicates that the primary key "2" is associated with the channel number "2" and the frequency corresponding to the channel number "2" is not a reserved channel. The primary key stored in the primary key field 23b of the channel profile table 23 can also be a foreign key for association with a particular record of another table, which has the same primary key. In order to improve access efficiency, the channel profile table 23 is preferably initiated to store a predetermined number of records (e.g. 100 records) and each initial record contains a channel number with an identical serial number (e.g. one of 1 to 100), a primary key "0", and a reserved flag "false" or "0".

Referring to FIG. 2, the channel configuration table 25 contains five fields, primary key 25a, frequency 25b, video standard 25c, audio standard 25d and channel name 25e, storing information indicating that a particular primary key is associated with a frequency, video signals carried by the frequency correspond to a video standard, audio signals carried by the frequency correspond to an audio standard, and the frequency corresponds to a channel name. The frequency field 25b may store a number ranging from 0 to 65,535 to represent a particular frequency when two bytes are allocated to store the frequency. The video field 25c may store a number ranging from 0 to 3 to represent a particular video standard. The audio standard field 25d may store a number ranging from 0 to 15 to represent a particular audio standard. For example, the video standard field thereof stores "1", "2" and "3" respectively indicating that video signals carried by a particular frequency correspond to the National TV Standards Committee (NTSC) standard, Phase Alternating Line (RAL) standard and Sequential Couleur Avec Memoire (SECAM) standard. The audio standard field thereof stores "1", "2" and "3" respectively indicating that audio signals carried by a particular frequency correspond to the BG, DK and I standards. A primary key stored in one primary key field 25a of the channel configuration table 25 can also be a foreign key for associating with a particular record of another table, which has the same primary key. In order to improve access efficiency, the channel configuration table 25 is preferably initiated to store a predetermined number of records (e.g. 100 records) and each initial record contains a primary key with an identical serial number (e.g. one of 1 to 100), a frequency with "0", video standard with "0", video standard with "0", and a channel name with "\0\0\0\0\0", NULL or an empty string.

Referring to FIG. 2, the cache table 29 contains two fields, primary key 29a and unassigned flag 29b, storing information indicating which primary keys have not been associated with any channel number. Note that the information implies that frequencies corresponding to such primary keys have not been associated with any channel number. For example, the primary key field thereof stores "1" and the unassigned flag thereof stores "0" indicating that the frequency corresponding to primary key "1" is not required to be associated with a channel number. The primary key field thereof stores "2" and the unassigned flag thereof stores "1" indicating that the frequency corresponding to primary key "2" is required to be associated with a channel number. A primary key stored in one primary key field 29a of the cache table 29 can also be a foreign key for associating with a particular record of another table, which has the same primary key. In order to improve access efficiency, the cache table 29 is preferably initiated to store a predetermined number of records (e.g. 100 records) and each initial record contains a primary key with an identical serial number (e.g. one of 1 to 100), and an unassigned flag with "0".

Figure 3B:
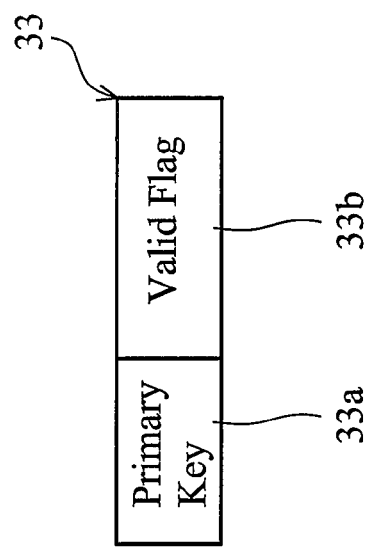
FIGS. 3a and 3b are diagrams of an exemplary data structure.
Figure 3A:
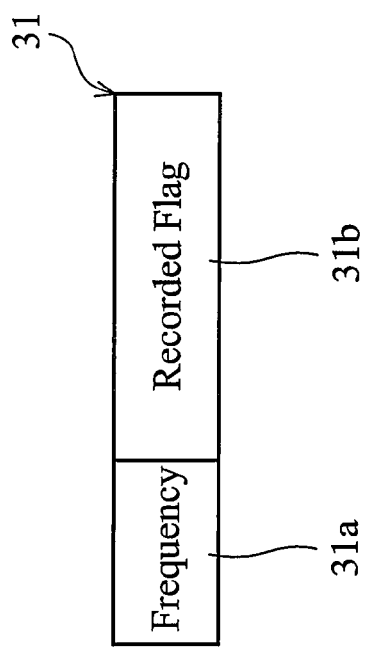

FIGS. 3a and 3b are diagrams of exemplary data structure. The storage device 16 stores a common frequency table 31 and a rare frequency table 33.

The common frequency table 31 contains two fields, frequency 31a and recorded flag 31b, storing information indicating whether channel configuration data corresponding to a frequency is recorded in a channel list. For example, a record of the common frequency table 31 storing a frequency "176.00" and a recorded flag "1" indicates that channel configuration data corresponding to the frequency "176.00" is recorded in the channel list. A record of the common frequency table 31 storing a frequency "495.25" and a recorded flag "0" indicates that channel configuration data corresponding to the frequency "495.25" is not recorded in the channel list. The channel list stores mapping relationships between channel numbers and frequencies. When an user selects a particular channel number, the tuner 11 is directed to lock on to a frequency corresponding to the selected channel number, and audio, video and teletext signals carried by the locked frequency are acquired and outputted. The channel list may be implemented in a single data table. Alternatively, these mapping relationships may be implemented in the channel profile table 23 or channel configuration table 25. In order to improve access efficiency, the common frequency table 31 is preferably initiated to store a predetermined number of records (e.g. 100 records) and each initial record contains a common frequency and a recorded flag with "false" or "0". The common frequencies may be configured by an operator prior to the automated channel updating system 10 leaving a factory.

Frequencies recorded in the common frequency table 31 may not be adequate because new channels are increasingly generated. Thus, the rare frequency table 33 is required to store the detected frequency being not pre-stored in the common frequency table 31. The rare frequency table 33 contains two fields, primary key 33a and valid flag 33b, storing information indicating whether channel configuration data corresponding to a frequency associated with a primary key is recorded in the channel list. For example, a record of the rare frequency table 33 storing a primary key "5" and a valid flag "1" or "true" indicates that channel configuration data corresponding to a frequency associated with the primary key "5" has been recorded in the channel list. The rare frequency table 33 is preferably initiated as an empty table.

Figure 4:
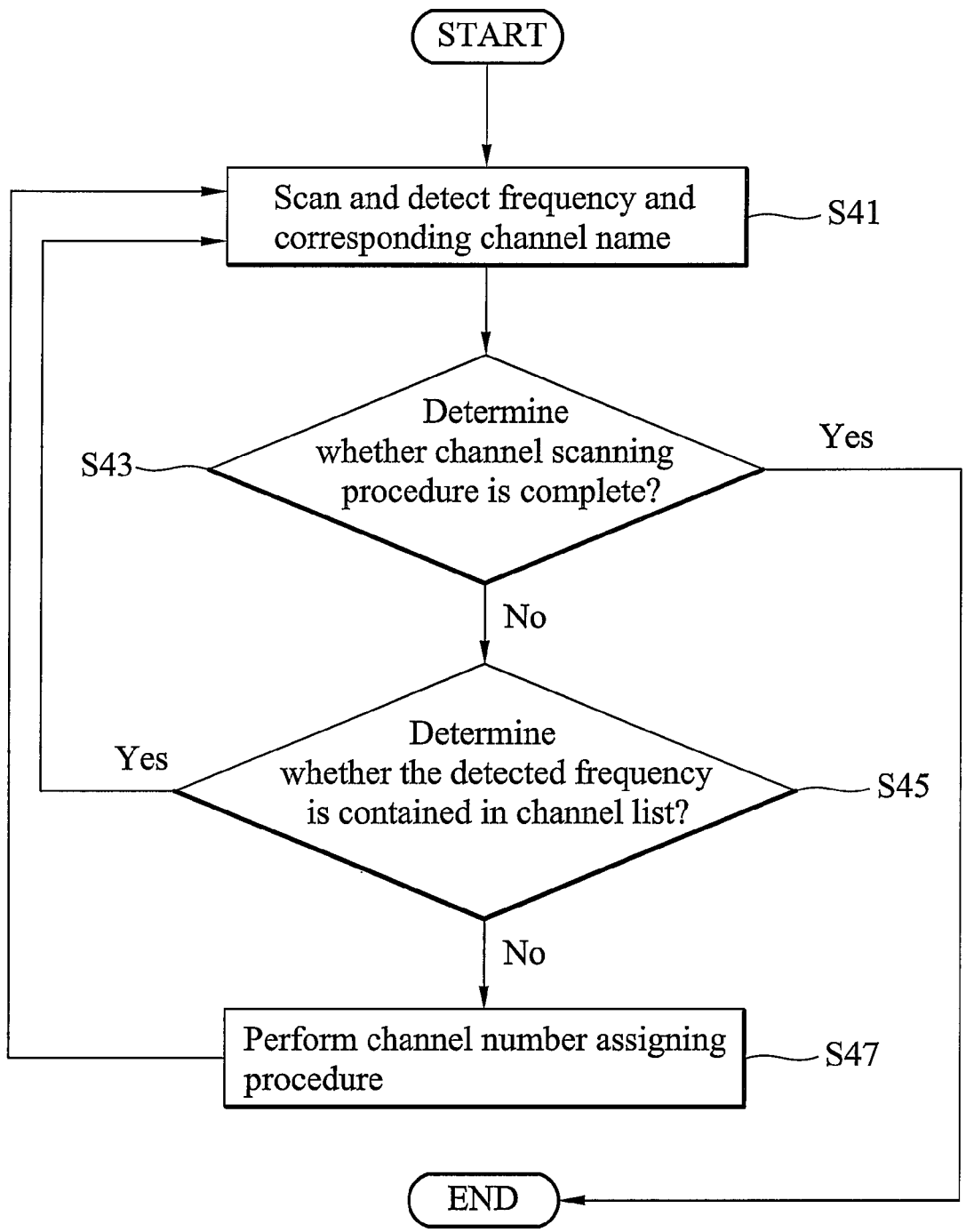
FIG. 4 is a flowchart of an embodiment of an automated channel updating method.

FIG. 4 is a flowchart of an embodiment of an automated channel updating method. The automated channel updating method scans all frequencies in a frequency segment (e.g. ranging from 41.25 MHz to 866.25 MHz), detects frequencies carrying video, audio or teletext signals, and determines whether the detected frequencies are contained in a channel list. If not, the detected frequencies and corresponding channel names are stored in the channel list. In step S41, a frequency and a corresponding channel name are scanned and detected. In step S43, it is determined whether a channel scanning procedure is complete. If so, the entire process ends. Otherwise, the process proceeds to step S45. In step S45, it is determined whether the detected frequency is contained in the channel list by querying the common frequency table 33 and the rare frequency table 33. If so, the process proceeds to step S41, or otherwise, to step S47. In step S47, a channel number assigning procedure is performed to assign a channel number in the channel list to the detected frequency, and subsequently, step S41 detects the next frequency.

Figure 5A:
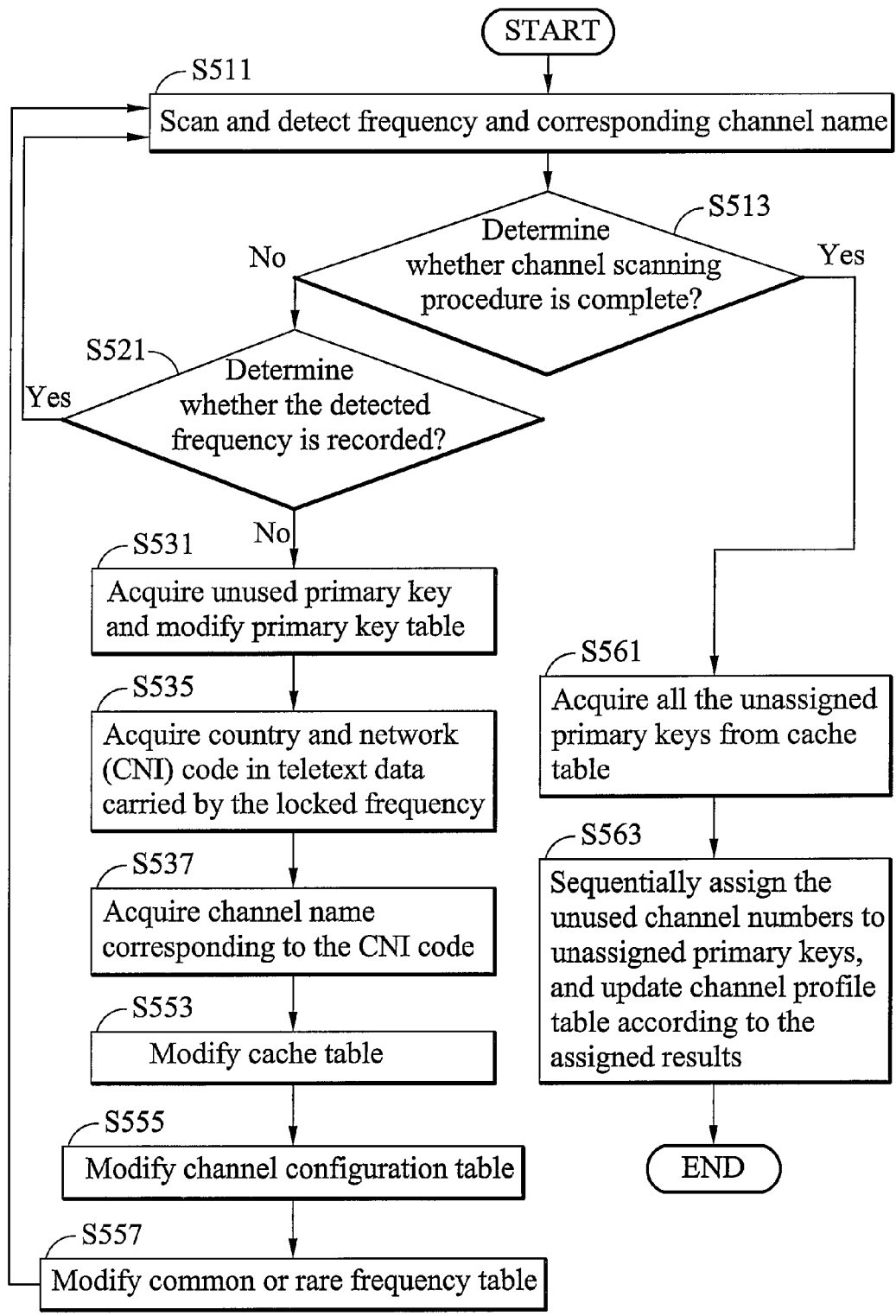
FIG. 5a is a flowchart of an embodiment of an automated channel updating method.
Figure 5B:
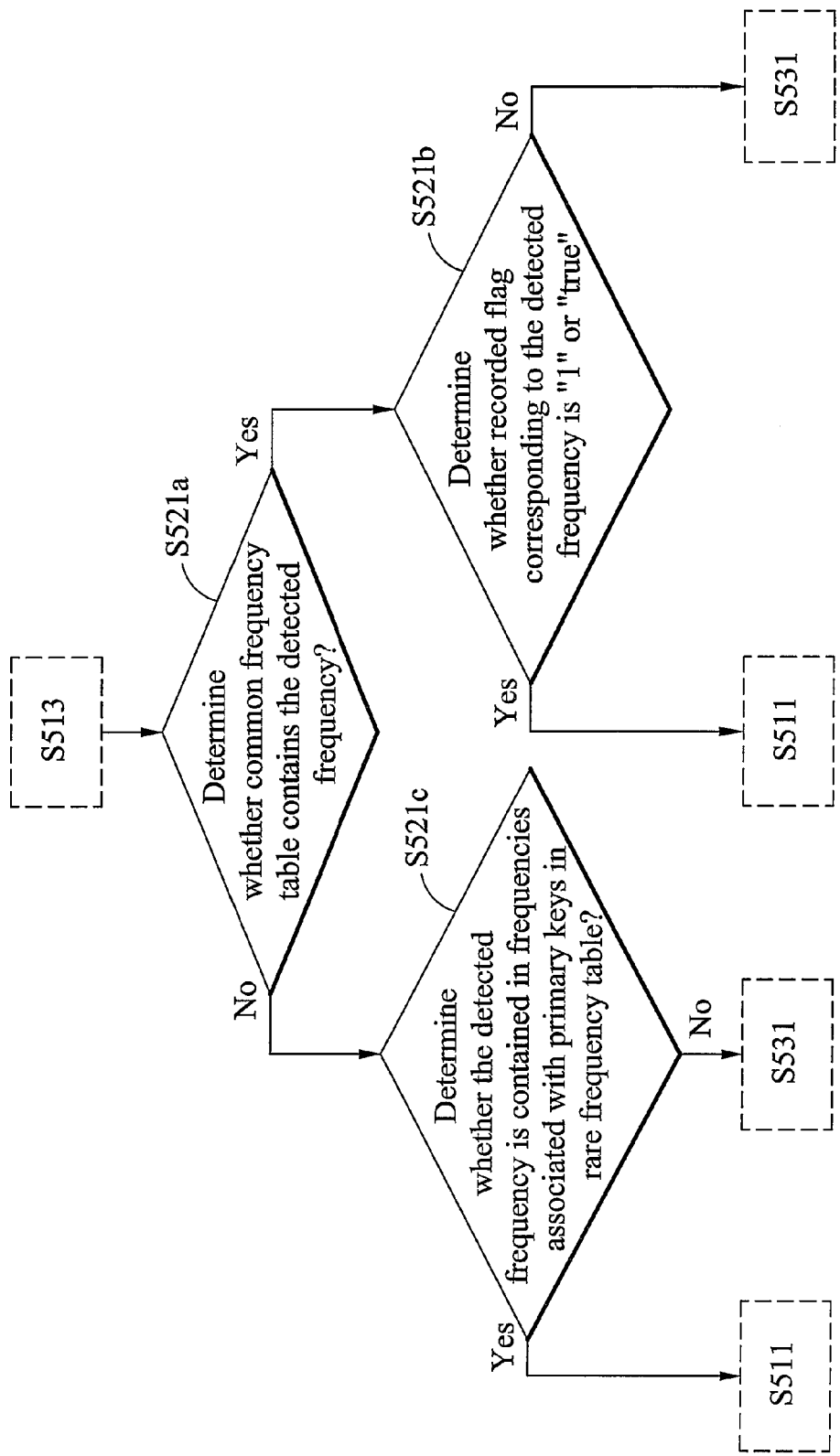

FIG. 5a is a flowchart of an embodiment of an automated channel updating method. The method begins in step S511 to scan and lock on to a frequency carrying channel data. In step S513, it is determined whether a frequency scanning operation is complete. If so, the process proceeds to step S561, or otherwise, to step S521. The completion of the frequency scanning operation may be determined according to the scanned frequency. For example, the frequency scanning operation is complete when frequencies are sequentially scanned from low to high and the detected or locked frequency is (or is near) the highest frequency. The frequency scanning operation is also complete when frequencies are sequentially scanned from high to low and the detected or locked frequency is (or is near) the lowest frequency. In step S521, it is determined whether the detected frequency is recorded. If so, the process proceeds to step S511, or otherwise, to step S531. The determination may be achieved by querying the common frequency table 31 or the rare frequency table 33. It is determined that the detected frequency has been recorded when the detected frequency falls into a tolerance range of a frequency f recorded in the common frequency table 31, for example, f±2 (MHz), and when the frequency f is recorded in the channel list. It is determined that the detected frequency has been recorded when the detected frequency falls into a tolerance range of a frequency f recorded in the rare frequency table 33, for example, f±2 (MHz), and when the frequency f is recorded in the channel list. Conversely, it is determined that the detected frequency has not been recorded when the detected frequency does not fall into any tolerance range of frequencies f recorded in the common frequency table 31 and the rare frequency table 33, for example, f±2 (MHz), or when the detected frequency falls into a tolerance range of the frequency f but is not recorded in the channel list. FIG. 5b is a flowchart of an embodiment of a detailed determination process performed by step S521 in FIG. 5a. In step S521a, it is determined whether the common frequency table 31 contains the detected frequency. If so, the process proceeds to step S521b, or otherwise, to a determination step S521c. In step S521b, it is determined whether a recorded flag corresponding to the detected frequency is "1" or "true". If so, the process proceeds to step S511 (FIG. 5a), or otherwise, to step S531 (FIG. 5a). In step S521c, it is determined whether the detected frequency is contained in frequencies associated with primary keys 33a in the rare frequency table 33. If so, the process proceeds to step S511 (FIG. 5a), or otherwise, to step S531 (FIG. 5a). In step S531, an unused primary key is acquired. The minimum unused primary key may be acquired from the primary key table 21, and an assigned flag of a record corresponding to the acquired primary key is set to "1". Those skilled in the art will realize that, when the primary key table 21 is not initiated, the primary key table 21 is initiated according to the described initiation. That is, the primary key table 21 is initiated to store a predetermined number of records (e.g. 100 records), the first initiated record contains a primary key with an identical serial number "1", and an assigned flag with "true" or "1", and the remaining initiated records respectively contain a primary key with an identical serial number (e.g. one of 2 to 100), and an assigned flag with "false" or "0". Those skilled in the art will realize that, all assigned flags corresponding to primary keys are set to "1" or "true", indicates that all primary keys are used. A record is therefore appended to the primary key table 21, and the appended record stores a primary key with the previous maximum primary key plus one, and an assigned flag with "1" or "true". In step S535, a country and network (CNI) code in teletext data carried by the locked frequency is acquired. The CNI code in teletext data carried by the locked frequency may be acquired by querying the teletext processor 14. In step S537, a channel name corresponding to the CNI code is acquired. The channel name corresponding to the CNI code may be acquired from a predefined channel name mapping table storing information indicating that a particular CNI code corresponds to a particular channel name.

In step S553, the cache table 29 is modified to store information indicating that the acquired primary key does not correspond to a channel number. An unassigned flag in a record containing the acquired primary key may be modified with "1". A record containing the acquired primary key and an unassigned flag "1" may be appended to the cache table 29 when the cache table 29 is not initiated. In step S555, the channel configuration table 25 is modified to store the acquired primary key associated with the detected frequency, and the video and audio standards, and the channel name corresponding to the detected frequency. In step S557, when the detected frequency falls into a tolerance range of a frequency in the common frequency table 31, the recorded flag of the matched frequency in the common frequency table 31 is set to "1" or "true". Otherwise, a record containing the acquired primary key and a valid flag with "1" or "true" is appended to the rare frequency table 33.

In step S561, all the unassigned primary keys are acquired from the cache table 29. The cache table 29 may be queried to acquire all the unassigned primary keys with unassigned flags "1". In step S563, the unused channel numbers are sequentially assigned to unassigned primary keys, and the channel profile table 23 is updated according to the assigned results. Unused channel numbers are those channel numbers associated with the primary key "0" in the channel profile table 23. In this step, two approaches can be employed to assign unused channel numbers. In a first approach, the unused channel numbers are sequentially assigned from the least to the greatest to the unassigned primary keys. In a second approach, unused channel numbers larger than the maximum of used channel numbers are sequentially assigned from the least to the greatest to the unassigned primary keys.

Figure 7:
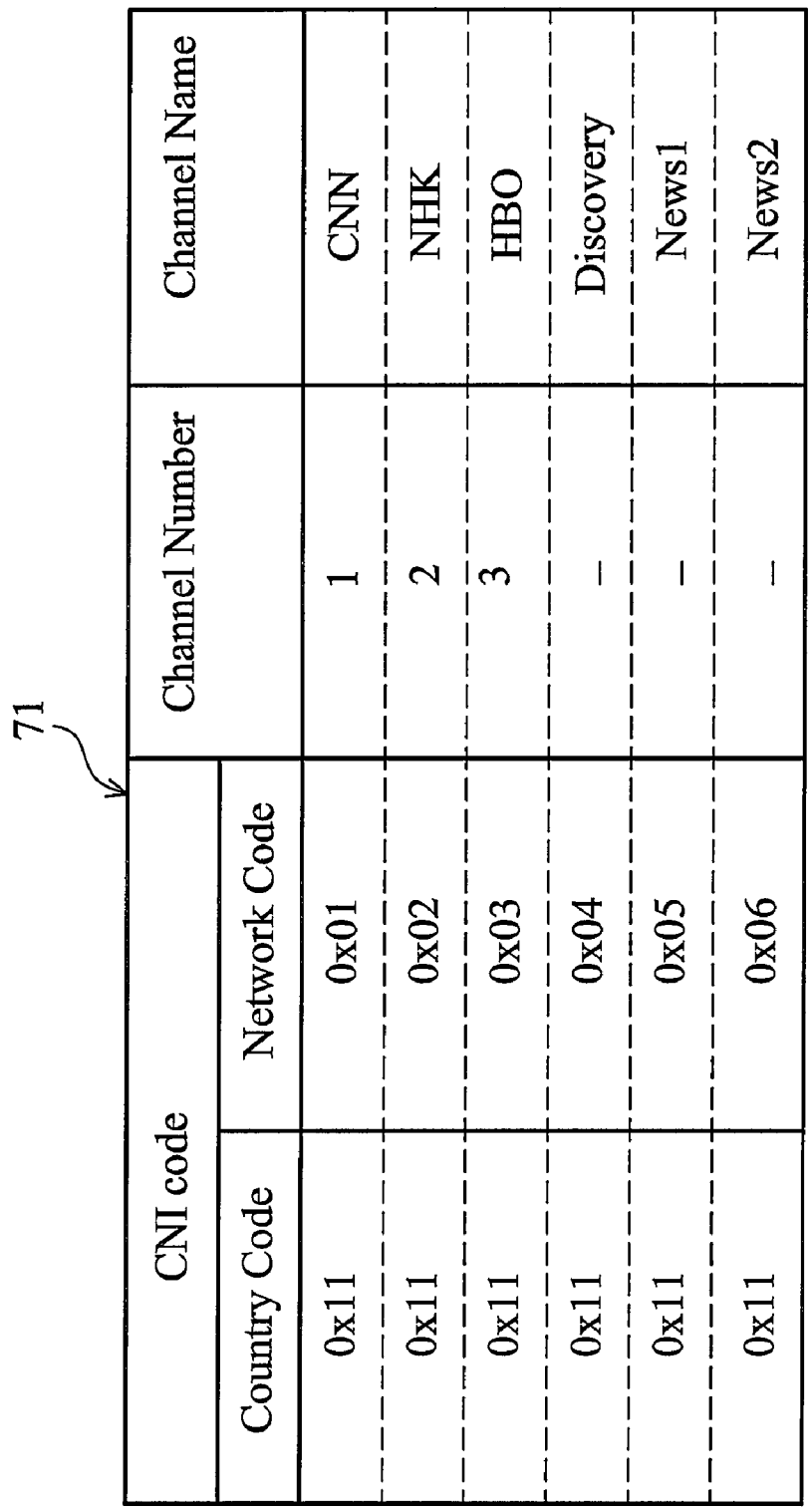
FIG. 7 is a diagram of an embodiment of a channel name and channel number mapping table.

Details of the methods for automated channel updating are further illustrated in the following examples. The stored primary key table 21, channel profile table 23, cache table 29, channel configuration table 25, common frequency table 31 and rare frequency table 33 are respectively shown in FIGS. 6a to 6f. FIG. 7 is a diagram of an embodiment of a channel name and channel number mapping table 71 which contains six records respectively storing information indicating that certain CNI codes correspond to specific channel numbers and channel names. A channel number field of a record stored as a specific number indicates that it is required to associate the frequency corresponding to the particular CNI code with that channel number. When the channel number field of a record stores "–", the frequency corresponding to the particular CNI code does not require to be associated with a particular channel number.

In the following examples, the frequencies are detected from low to high, and the automated channel updating methods are performed for the detected frequencies. Supposing that these frequencies, "176.00", "495.25", "655.25" and "712.00" MHz are detected, and that the lowest and the highest frequencies of the scanning range are "41.25" and "866.25" MHz. Further, the tolerance range of a frequency f stored in the common frequency table 31 is set to "2" MHz, i.e. any frequency falling into the range f±2 MHz is regarded as the frequency f.

When executing step S511, the frequency "176.00" MHz is locked on to. When executing step S513, it is determined that the locked frequency "176.00" MHz falls into the frequency range between "41.25" MHz and "866.25" MHz and is not "41.25" MHz or "866.25" MHz. Thus, it is determined that the frequency scanning operation is not complete. When executing step S521, it is determined that the detected frequency "176.00" MHz falls into the tolerance range of the frequency "176.00" MHz, which is "174.00" to "178.00" MHz (i.e. 176.00±2 MHz). While it is determined that the detected frequency "176.00" MHz is covered by the record of the frequency "176.00" MHz in the common frequency table 31 of FIG. 6e (step S521a), the recorded flag of that record is "1" which means the frequency "176.00" MHz is already in the channel list (step S521b). Therefore, step S511 is performed. When executing step S511, the frequency "495.25" MHz is locked on to. When executing step S513, it is determined that the locked frequency "495.25" MHz falls into the frequency range between "41.25" MHz and "866.25" MHz and is not "41.25" MHz or "866.25" MHz. Thus, it is determined that the frequency scanning operation is not complete. When executing step S521, it is determined that the detected frequency "495.25" MHz falls into the tolerance range of the frequency "495.50" MHz, which is "493.50" to "497.50" MHz (i.e. 495.50±2 MHz). While it is determined that the detected frequency "495.25" MHz is covered by the record of the frequency "495.50" MHz in the common frequency table 31 of FIG. 6e (step S521a), the recorded flag of that record is "1" which means the frequency "495.50" MHz is already in the channel list (step S521b). Therefore, step S511 is performed. When executing step S511, the frequency "655.25" MHz is locked on to. When executing step S513, it is determined that the locked frequency "655.25" MHz falls into the frequency range between "41.25" MHz and "866.25" MHz and is not "41.25" MHz or "866.25" MHz. Thus, it is determined that the frequency scanning operation is not complete. When executing step S521, it is determined that the detected frequency "655.25" MHz falls into the tolerance range of the frequency "655.00" MHz, which is "653.00" to "657.00" MHz (i.e. 655.00±2 MHz). While it is determined that the detected frequency "655.25" MHz is covered by the record of the frequency "655.00" MHz in the common frequency table 31 of FIG. 6e (step S521a), the recorded flag of that record is "1" which means the frequency "655.00" MHz is already in the channel list (step S521b). Therefore, step S511 is performed.

When executing step S511, the frequency "712.00" MHz is locked on to. When executing step S513, it is determined that the locked frequency "712.00" MHz falls into the frequency range between "41.25" MHz and "866.25" MHz and is not "41.25" MHz or "866.25" MHz. Thus, it is determined that the frequency scanning operation is not complete. When executing S521, it is determined that the detected frequency does not fall into any tolerance range of the frequencies whose recorded flags are marked as "1" in the common frequency table 31, and does not fall into any tolerance range of frequencies corresponding to the primary keys in the rare frequency table 33, thus, step S531 is performed. When executing step S531, the primary key "6" is acquired because the primary key "6" 21a is a minimum primary key value with a assigned flag "0" 21b in the primary key table 21 (FIG. 6a). The corresponding record in the primary key table 21 (i.e. the record having the primary key "6") is updated to set assigned flag field to "1." The modification result is shown in FIG. 8a. When executing step S535, the CNI code carried in the locked frequency "712.00" MHz is acquired by querying the teletext processor 14. Supposing that the acquired CNI code is "0x11 0x05". When executing step S537, the channel name "News1" corresponding to the CNI code "0x11 0x05" is acquired by retrieving the predefined channel name and channel number mapping table 71 (FIG. 7). When executing step S541, it is determined that the acquired channel name "News1" does not map to any channel numbers (i.e. the corresponding channel number field has "–") by retrieving the predefined channel name and channel number mapping table 71. When executing step S553, the corresponding record in the cache table 29 (FIG. 6*c*), i.e. the record having the primary key "6", is updated to set the unassigned flag field to "1." The modification result is shown in FIG. 8*b*. When executing step S555, the corresponding record in the channel configuration table 25 (FIG. 6*d*), i.e. the record having the primary key "6", is updated to set the content of the frequency, video standard, audio standard and channel name fields. The modification result is shown in FIG. 8*c*. When executing step S557, the corresponding record in the common frequency table 31, i.e. the record having the frequency "711.00" MHz, is updated to set the recorded flag field to "1." The modification result is shown in FIG. 8*d*.

When executing step S511, the tuner locks on to frequency "866.25" MHz. When executing step S513, it is determined that the scanned frequency "866.25" is the highest frequency of the frequency range. Thus, it is determined that the frequency scanning operation is complete. When executing step S561, all the unassigned primary keys are acquired by retrieving corresponding records of the cache table 29 as shown in FIG. 8*b* (i.e. records having unassigned flags of "1"). In these examples, only the primary key "6" is an unassigned primary key. When executing step S563, an unassigned channel number is assigned to the unassigned primary key "6", and the channel profile table 23 is accordingly updated. In this step, the channel number "2" is assigned to the primary key "6" when employing the first approach, i.e. sequentially assigning unused channel numbers from the least to the greatest to the unassigned primary keys, the modification result as shown in FIG. 8*e*. Alternatively, the channel number "7" is assigned to the primary key "6" when employing the second approach, i.e. sequentially assigning unused channel numbers larger than the maximum of used channel numbers to the unassigned primary keys. The modification result is shown in FIG. 8*f*. Note that, because the CNI code "0x11 0x05" corresponding to the primary keys "6" does not correspond to any reserved channel numbers, the reserved flag of corresponding records in the channel profile table 23 is set to "0" no matter the first or the second approach is employed to update the channel profile table 23.

Certain terms are used throughout the description and claims to refer to particular system components. As one skilled in the art will appreciate, consumer electronic equipment manufacturers may refer to a component by different names. This disclosure does not intend to distinguish between components that differ in name but not function.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A method for automated channel updating for a plurality of frequencies, comprising:
    (a) scanning the plurality of frequencies in sequence and detecting when a scanned frequency is carrying channel data;
    (b) for each scanned frequency, when it is detected that the frequency carries channel data, determining whether a channel list comprises the frequency by retrieving a frequency table, the frequency table storing information indicating whether the channel list comprises the frequency, the channel list recording a mapping relationship between a channel number and the frequency;
    (c-1) performing a default frequency assigning operation comprising:
        (c-1-1) determining whether the frequency maps to a default channel number;
        (c-1-2) assigning the default channel number to the frequency when the frequency maps to the default channel number; and
        (c-1-3) storing the frequency in a cache table when the frequency does not map to the default channel number, and not storing the frequency in the cache table when the frequency maps to the default channel number, wherein the order of steps (c-1-2) and (c-1-3) can be exchanged; and
    (d) after the scanning the plurality of frequencies is completed, assigning an unused channel number to each frequency in the cache table.

2. The method as claimed in claim 1 wherein, in step (d), the unused channel number is sequentially assigned from the least to the greatest to the frequency in the cache table.

3. The method as claimed in claim 1 wherein, in step (d), the unused channel number larger than the maximum of used channel numbers is sequentially assigned from the least to the greatest to the frequency in the cache table.

4. The method as claimed in claim 1 wherein step (c-1-1) further comprises:
    (c-1-1-1) acquiring a country and network (CNI) code corresponding to the frequency;
    (c-1-1-2) acquiring a channel name corresponding to the CNI code; and
    (c-1-1-3) determining whether the channel name corresponding to the frequency maps to the default channel number.

5. The method as claimed in claim 4 wherein the CNI code is acquired by querying a teletext processor.

6. The method as claimed in claim 1 wherein the frequency table is a common frequency table or a rare frequency table, the common frequency table stores a plurality of common frequencies and whether each common frequency has been recorded in the channel list, and the rare frequency table stores that at least one rare frequency has been recorded in the channel list.

7. The method as claimed in claim 1, performed in a CRT display, a plasma display panel (PDP) display, a liquid crystal display (LCD), an organic light-emitting diode displays (OLED) or a TV box.

8. The method as claimed in claim 1 wherein step (b) further comprises determining whether the detected frequency falls into a tolerance range of the frequency in the frequency table; and, if not, indicating that the detected frequency is not in the channel list.

9. A system for automated channel updating for a plurality of frequencies, comprising:
    a storage device storing a frequency table and a channel list, the frequency table storing information indicating whether the channel list comprises a frequency, the channel list recording a mapping relationship between a channel number and the frequency; and
    a processing unit coupling to the storage device, configured to scan the plurality of frequencies in sequence and detect when a scanned frequency is carrying channel data, and for each scanned frequency, when it is detected that the frequency carries channel data, determine whether the channel list comprises the frequency by retrieving the frequency table, and assign an unused channel number in the channel list to the detected frequency not in the channel list by executing a default channel number assigning operation, wherein the channel number assigning operation comprises:
  determining whether the frequency maps to a default channel number;
  assigning the default channel number to the frequency when the frequency maps to the default channel number; and
  storing the frequency in a cache table when the frequency does not map to the default channel number, and not storing the frequency in the cache table when the frequency maps to the default channel number; and
wherein the processing unit is further configured to assign an unused channel number to each frequency in the cache table after the scanning the plurality of frequencies is completed.

10. The system as claimed in claim 9 wherein the processing unit sequentially assigns the unused channel number from the least to the greatest to the frequency in the cache table.

11. The system as claimed in claim 9 wherein the processing unit sequentially assigns the unused channel number larger than the maximum of used channel numbers from the least to the greatest to the frequency in the cache table.

12. The system as claimed in claim 9 wherein the processing unit acquires a country and network (CNI) code corresponding to the frequency, acquires a channel name corresponding to the CNI code, and determines whether the channel name corresponding to the frequency maps to the default channel number.

13. The system as claimed in claim 12 further comprising a teletext processor coupling to the processing unit, wherein the processing unit acquires the CNI code by querying the teletext processor.

14. The system as claimed in claim 9 wherein the frequency table is a common frequency table or a rare frequency table, the common frequency table stores a plurality of common frequencies and whether each common frequency has been recorded in the channel list, and the rare frequency table stores that at least one rare frequency has been recorded in the channel list.

15. The system as claimed in claim 9 installed in a CRT display, a plasma display panel (PDP) display, a liquid crystal display (LCD), an organic light-emitting diode display (OLED) or a TV box.

16. The system as claimed in claim 9 wherein the processing unit determines whether the detected frequency falls into a tolerance range of the frequency in the frequency table, and, if not, indicates that the detected frequency is not in the channel list.

* * * * *